United States Patent
Schudy et al.

(10) Patent No.: US 10,161,515 B2
(45) Date of Patent: Dec. 25, 2018

(54) ACTUATING DEVICE FOR A MANUAL TRANSMISSION AND A CLUTCH UNIT OF A COMMERCIAL VEHICLE

(71) Applicant: KNORR-BREMSE Systeme fuer Nutzfahrzuege GmbH, Munich (DE)

(72) Inventors: Juergen Schudy, Munich (DE); Daniel Geis-Esser, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 367 days.

(21) Appl. No.: 15/006,585

(22) Filed: Jan. 26, 2016

(65) Prior Publication Data

US 2016/0138710 A1    May 19, 2016

Related U.S. Application Data

(63) Continuation of application No. PCT/EP2014/064501, filed on Jul. 8, 2014.

(30) Foreign Application Priority Data

Jul. 26, 2013   (DE) .................. 10 2013 012 402

(51) Int. Cl.
*F16H 61/30*     (2006.01)
*F16H 61/00*     (2006.01)

(52) U.S. Cl.
CPC .......... *F16H 61/30* (2013.01); *F16H 61/0003* (2013.01); *F16H 2061/308* (2013.01)

(58) Field of Classification Search
CPC ........................... F16H 61/30; F16H 2061/308
See application file for complete search history.

(56) References Cited

U.S. PATENT DOCUMENTS

| 9,770,971 | B1* | 9/2017 | Oba ................. B60K 6/365 |
| 2005/0011716 | A1 | 1/2005 | Nitzschke |
| 2008/0067022 | A1 | 3/2008 | Schnitzer |

(Continued)

FOREIGN PATENT DOCUMENTS

| DE | 10 2004 002 064 A1 | 8/2005 |
| DE | 10 2006 040 136 A1 | 3/2008 |

(Continued)

OTHER PUBLICATIONS

International Preliminary Report on Patentability (PCT/IB/326 & PCT/IB/373) issued in PCT Application No. PCT/EP2014/064501 dated Feb. 4, 2014, including Written Opinion (PCT/ISA/237) with English translation, (thirteen (13) pages).

(Continued)

*Primary Examiner* — Terence Boes
(74) *Attorney, Agent, or Firm* — Crowell & Moring LLP

(57) ABSTRACT

An actuating device is provided for a manual transmission having at least one clutch unit of a commercial vehicle. The actuating device includes transmission-actuating elements for the mechanical actuation of the manual transmission and clutch actuating elements for the fluidic actuation of the clutch unit. At least two actuating cylinders as transmission-actuating elements for actuating the manual transmission coupled thereto and at least one compressed-air connection as a clutch-actuating element for actuating the clutch unit connected thereto are arranged in a common carrier housing.

9 Claims, 1 Drawing Sheet

(56) References Cited

U.S. PATENT DOCUMENTS

| | | | |
|---|---|---|---|
| 2008/0070749 A1 | 3/2008 | Schnitzer | |
| 2008/0295634 A1* | 12/2008 | Olds | F16H 61/30 |
| | | | 74/473.37 |
| 2012/0137806 A1* | 6/2012 | Moorman | F16H 61/0206 |
| | | | 74/340 |
| 2014/0124323 A1* | 5/2014 | Heubner | F15B 7/08 |
| | | | 192/85.01 |
| 2015/0008350 A1* | 1/2015 | Kraft | F16H 61/0206 |
| | | | 251/129.15 |
| 2015/0337953 A1* | 11/2015 | Kasuya | B60K 6/48 |
| | | | 192/219.5 |

FOREIGN PATENT DOCUMENTS

| | | |
|---|---|---|
| DE | 10 2008 015 173 A1 | 9/2009 |
| EP | 2 381 137 A1 | 10/2011 |
| WO | WO 01/51829 A2 | 7/2001 |
| WO | WO 03/029040 A1 | 4/2003 |
| WO | WO 2006/106074 A1 | 10/2006 |
| WO | WO 2006/106076 A2 | 10/2006 |
| WO | WO 2011/069526 A1 | 6/2011 |

OTHER PUBLICATIONS

International Search Report (PCT/ISA/210) issued in PCT Application No. PCT/EP2014/064501 dated Sep. 9, 2014, with English translation (four (4) pages).
German Office Action issued in counterpart German Application No. 10 2013 012 402.6 dated May 12, 2014 (eight (8) pages).

* cited by examiner though there are automatic 12-gear-three-range transmissions with PowerShift, for example.

ACTUATING DEVICE FOR A MANUAL TRANSMISSION AND A CLUTCH UNIT OF A COMMERCIAL VEHICLE

CROSS REFERENCE TO RELATED APPLICATIONS

This application is a continuation of PCT International Application No. PCT/EP2014/064501, filed Jul. 8, 2014, which claims priority under 35 U.S.C. § 119 from German Patent Application No. 10 2013 012 402.6, filed Jul. 26, 2013, the entire disclosures of which are herein expressly incorporated by reference.

BACKGROUND AND SUMMARY OF THE INVENTION

The invention relates to an actuating device for a manual transmission having a clutch unit of a commercial vehicle, including transmission control elements for mechanical actuation of the manual transmission and clutch control elements for actuation of the clutch unit by a fluid medium.

The sphere of application of the invention extends primarily to commercial vehicle construction. A central feature of many manual transmissions of commercial vehicles, especially for local and goods delivery traffic, long-distance transportation and also for intercity bus and coach traffic, is the auxiliary range transmission design having a plurality of gear steps. This construction is increasingly used for automatic manual transmission (AMT) on commercial vehicles. Thus, there are automatic 12-gear-three-range transmissions with PowerShift, for example.

Manual transmissions for commercial vehicles may, in principle, have varying degrees of automation. Here, the actuation of the shift clutch and the gear selection may be automated, depending on the type of driveaway mechanism. In manually shifted transmissions none of these mechanisms is automated, in semi-automated manual transmissions one of these mechanisms is automated and in the fully automatic manual transmissions of interest here all mechanisms are automated. From this arises the need to use suitable actuating devices for an automated driveaway clutch, an automated declutching when shifting gear and an automated gear selection and engine management.

The generally known way of allowing automated clutch actuation and automated gear selection is through the use of various control elements in the form of electro-pneumatic, electro-hydraulic and electro-mechanical actuators. In generally known automated manual transmissions use is made of so-called clutch control elements and transmission control elements, which are arranged in or on the manual transmission.

WO 2011/069526 A1 sets forth a commercial vehicle transmission, which is of a dual-clutch transmission type. Such a transmission concept may call for two physically separated transmission control elements in the form of actuators for automated actuation of the internal gearshift elements, such as gearshift rods, gearshift forks, dog clutches, synchromesh mechanisms and the like, integrated in the transmission. Here, in this case one of the transmission control elements may also serve for controlling the dual clutch by means of a fluid control medium. Furthermore, this type of transmission may also contain a central synchromesh mechanism, the actuation of which can likewise be performed by a transmission control element. Here, the choice of fluid control medium for these functions is basically between compressed air and hydraulic oil.

The physical separation of the various transmission control elements and the associated electronic transmission control requires a correspondingly large overall space on the transmission and/or clutch housing and a corresponding assembly outlay, especially for the pressure line connection.

The object of the invention, therefore, is to provide an actuating device of compact construction for an automated manual transmission, having at least one clutch unit, which can be easily and compactly fitted in or on the transmission housing.

This and other objects are achieved by an actuating device for a manual transmission with at least one clutch unit of a commercial vehicle, having transmission control elements for mechanical actuation of the manual transmission and clutch control elements for actuation of the clutch unit by a fluid medium. At least two operating cylinders serving as transmission control elements for actuating the manual transmission coupled thereto, together with at least one compressed air connection serving as clutch control elements for actuating the clutch unit connected thereto, are arranged in a common carrier housing.

The invention embraces the technical teaching that at least two operating cylinders serving as transmission control elements for actuating a manual transmission coupled thereto, together with at least one compressed air connection serving as clutch control elements for actuating a clutch unit connected thereto, are arranged, functionally integrated, in a common carrier housing of a modular actuating device.

The advantage of the solution according to the invention lies, in particular, in the fact that all sub-function units for actuating the manual transmission and at least the one clutch unit connected thereto are accommodated inside the common carrier housing of what constitutes one actuating device of compact construction, and can be integrated into an automated drivetrain of a commercial vehicle via corresponding fluid, mechanical and electrical interfaces. The high degree of functional integration and the resulting space-saving design allow the actuating device according to the invention to be fitted both in and on a transmission or clutch housing. The actuating device can therefore be described as a module which can be fitted and replaced separately as a self-contained unit.

According to a preferred embodiment of the invention, the operating cylinders for mechanical actuation of the manual transmission are arranged axially parallel at a distance from one another in the carrier housing. The operating cylinders serve for mechanical actuation of the gearshift mechanisms in the automated transmission, for which corresponding coupling points are provided on the manual transmission.

At least one further operating cylinder, which can be used for the synchronization of transmission components, is preferably arranged in the carrier housing next to the two aforementioned operating cylinders. For reasons of overall space, the axis of this additional operating cylinder may be offset parallel to the effective axis of a gearshift element corresponding to this in the transmission. In this case both axes are preferably connected to mechanical coupling elements.

In order to control the operating cylinders integrated in the carrier housing pneumatically with compressed air, the carrier housing preferably includes directional control valves assigned to these.

Besides the one compressed air connection serving as a clutch control element for actuating the clutch unit connected thereto, according to the preferred embodiment the carrier housing includes a further compressed air connection, in order to actuate a further clutch unit of an automated manual transmission, for example. In this case the compressed air connections may preferably each, in turn, be divided into a ventilation aperture and a venting aperture.

For compressed air control, multiple, integrated directional control valves, the working connection of which opens at an associated compressed air connection, are preferably provided in the carrier housing.

The functionally integrated actuating device further includes an electronic unit, which is preferably arranged on the base of the carrier housing and which serves as an electrical interface for external transmission and clutch control of the manual transmission. An electrical wiring harness can be connected to the electronic unit.

The carrier housing of the actuating device is preferably designed as a divided diecast component, in which pneumatic ducts are integrally formed for ducting the compressed air. Additional pneumatic connecting lines inside the carrier housing are in as much eliminated. The inasmuch functionally integrated carrier housing may furthermore also incorporate cylinder openings for the operating cylinders and assume valve housing functions. All mechanical and pneumatic forces are supported in the carrier housing. The resulting reaction forces are supported via correspondingly predefined connection points on the manual transmission.

The carrier housing preferably has a basic housing, which can be closed by a cover, detachably fixed thereto by screws and which may be provided with a surface coating. Furthermore, the carrier housing may also contain travel sensors for determining the position of the control pistons, which can be connected to the electronic unit for evaluating the sensor signals. The electronic unit serves primarily for controlling the directional control valves integrated in the carrier housing. The control signals needed for this purpose are provided by an overriding control unit, preferably in the form of an external transmission and clutch control module, via the electrical wiring harness.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
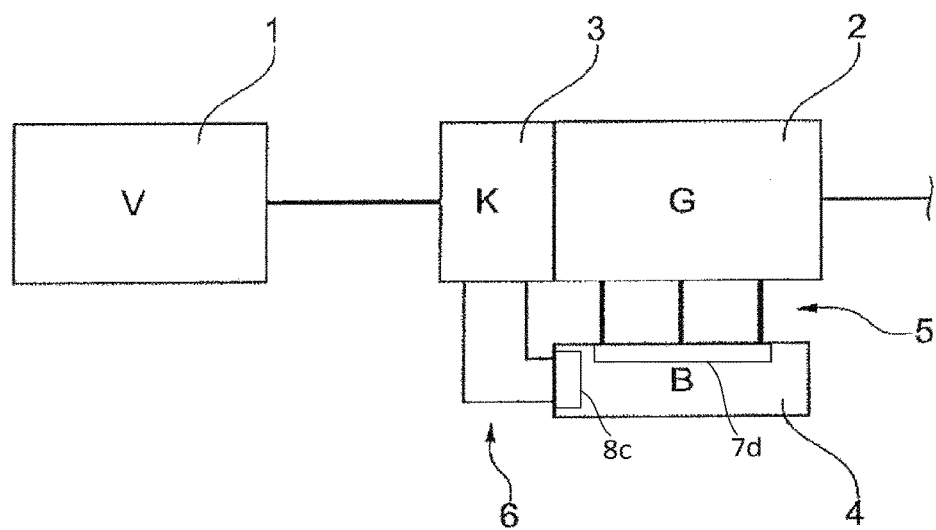
FIG. 1 is a diagrammatic representation of the part of a drivetrain of a commercial vehicle having a modular actuating device for a manual transmission with a clutch unit according to an embodiment of the present invention.

According to FIG. 1, the drivetrain (here represented in part) of a commercial vehicle includes an internal combustion engine 1, to which a manual transmission 2 having a clutch unit 3 is connected on an output side. An actuating device accommodated in a modular carrier housing 4 is equipped with transmission control elements for mechanical actuation of the manual transmission 2 by way of mechanical clutch elements 5, and clutch control elements for pneumatic actuation of the clutch unit 3 by way of pneumatic connecting lines 6.

Figure 2:
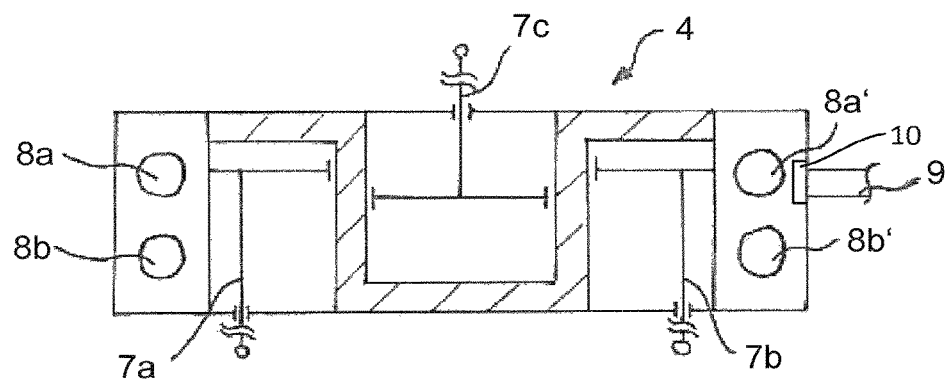
FIG. 2 is a diagrammatic representation of the modular actuating device.

According to FIG. 2, two operating cylinders 7a,7b serving as transmission control elements for actuation of the manual transmission 2 (not represented here) are arranged symmetrically in a carrier housing 4 formed as a diecast component. Also arranged on the carrier housing 4 are two pairs of compressed air connections 8a, 8b and 8a', 8b', which serve as clutch control elements for actuating the clutch unit 3 (not represented here) connected thereto.

A further operating cylinder 7c, which serves as a synchronizing cylinder for the manual transmission 2 and the axis of which is offset parallel to the effective axis of a gearshift element of the manual transmission 2 to be actuated, is furthermore arranged in the carrier housing 4. The—in this case—third operating cylinder 7c is arranged between the other two operating cylinders 7a and 7b.

Altogether, for controlling the three operating cylinders 7a-7c, five 3/2-way directional control valves 7d are used, integrated in the base part of the carrier housing 4. For controlling the two clutch units 3, a total of nine 2/2-way directional control valves 8c are furthermore used, integrated in the carrier housing 4.

In addition, an electronic unit 10 serving as an electrical interface for the external transmission and clutch control is also arranged in the base part, to which unit the electrical wiring harness 9 is connected. All pneumatic ducts for ducting the compressed air are integrally formed inside the carrier housing 4.

The invention is not limited to the preferred exemplary embodiment described above. On the contrary, modifications departing from this, which are encompassed by the scope of the following claims, are also feasible. Thus it is also possible, for example, to arrange a number of operating cylinders serving as transmission control elements or compressed air connections serving as clutch connections inside the functionally integrated actuating device. The geometric dimensions of the modular actuating device are determined by the geometric dimensions of the interfaces to the manual transmission.

LIST OF REFERENCE NUMERALS 1 internal combustion engine
2 manual transmission
3 clutch unit
4 carrier housing
5 coupling means
6 connecting lines
7a,7b,7c operating cylinder
7d 3/2-way directional control valves
8a,8a',8b,8b' compressed air connection
8c 2/2-way directional control valves
9 wiring harness
10 electronic unit The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An actuating device for a manual transmission having at least one clutch unit of a vehicle, comprising:
   first and second operating cylinders which serve as transmission control elements for mechanical actuation of the manual transmission coupled thereto;
   at least one compressed air connection serving as a clutch control element for actuation of, via a fluid medium, the clutch unit coupled thereto;

a further operating cylinder which serves as a synchronizing cylinder for the manual transmission; the further operating cylinder having an axis offset parallel to an effective axis of a gear shift element of the manual transmission to be actuated; and a common carrier housing in which are arranged the first and second operating cylinders, the further operating cylinder and the at least one compressed air connection.

2. The actuating device according to claim 1, wherein the first and second operating cylinders that actuate the manual transmission are arranged axially parallel at a distance from one another in the carrier housing.

3. The actuating device according to claim 1, further comprising multiple directional control valves integrated into the carrier housing, the multiple directional control valves being configured to control at least the first and second operating cylinders.

4. The actuating device according to claim 1, further comprising a further compressed air connection for actuating a further clutch unit connected thereto, the further compressed air connection being provided in the common carrier housing.

5. The actuating device according to claim 1, wherein the clutch unit is a driveaway clutch.

6. The actuating device according to claim 1, wherein two compressed air connections are arranged in the common carrier housing, one compressed air connection being provided for ventilating and one compressed air connection being provided for venting of the clutch unit which is pneumatically actuated.

7. The actuating device according to claim 6, further comprising multiple directional control valves integrated into the carrier housing, the multiple directional control valves being configured for compressed air control of the compressed air connections.

8. The actuating device according to claim 1, further comprising an electronic unit serving as an electrical interface for external transmission and clutch control, an electrical wiring harness being connectable to the electronic unit, wherein the electronic unit is arranged in a base part of the common carrier housing.

9. The actuating device according to claim 1, wherein the common carrier housing is configured as a divided die-cast component, in which pneumatic ducts for ducting compressed air are integrally formed.

* * * * *